United States Patent
Kase et al.

(10) Patent No.: US 9,553,311 B2
(45) Date of Patent: Jan. 24, 2017

(54) POSITIVE ELECTRODE ACTIVE MATERIAL FOR NON-AQUEOUS ELECTROLYTE SECONDARY BATTERY AND PRODUCTION METHOD FOR SAME, PRECURSOR FOR POSITIVE ELECTRODE ACTIVE MATERIAL, AND NON-AQUEOUS ELECTROLYTE SECONDARY BATTERY USING POSITIVE ELECTRODE ACTIVE MATERIAL

(71) Applicants: SUMITOMO METAL MINING CO., LTD., Tokyo (JP); TOYOTA JIDOSHA KABUSHIKI KAISHA, Aichi (JP)

(72) Inventors: Katsuya Kase, Niihama (JP); Syuhei Oda, Niihama (JP); Ryuichi Kuzuo, Niihama (JP); Yutaka Oyama, Aichi (JP)

(73) Assignees: SUMITOMO METAL MINING CO., LTD, Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 45 days.

(21) Appl. No.: 14/564,261

(22) Filed: Dec. 9, 2014

(65) Prior Publication Data
US 2015/0108398 A1 Apr. 23, 2015

Related U.S. Application Data

(62) Division of application No. 13/638,171, filed as application No. PCT/JP2011/057242 on Mar. 24, 2011, now Pat. No. 8,999,573.

(30) Foreign Application Priority Data

Mar. 29, 2010 (JP) ................................ 2010-075280

(51) Int. Cl.
H01M 4/52 (2010.01)
H01M 4/485 (2010.01)
(Continued)

(52) U.S. Cl.
CPC .............. *H01M 4/523* (2013.01); *C01G 53/42* (2013.01); *C01G 53/50* (2013.01); *C01G 53/66* (2013.01);
(Continued)

(58) Field of Classification Search
CPC ....... H01M 4/523; H01M 4/485; C01G 53/42; C01G 53/66
See application file for complete search history.

(56) References Cited

U.S. PATENT DOCUMENTS 6,193,946 B1 2/2001 Kawano et al.
6,929,883 B2 8/2005 Suhara et al.
(Continued)

FOREIGN PATENT DOCUMENTS

CN 1489230 A 4/2004
JP 07-335220 12/1995
(Continued)

OTHER PUBLICATIONS

Office Action, dated Mar. 31, 2014, issued by the Korean Intellectual Property Office in corresponding Application No. KR 10-2012-7028055, 5 pages.
(Continued)

*Primary Examiner* — Stewart Fraser
(74) *Attorney, Agent, or Firm* — Finnegan, Henderson, Farabow, Garrett & Dunner, LLP

(57) ABSTRACT

Provided is a cathode active material for a non-aqueous electrolyte secondary battery capable of obtaining high initial discharge capacity and good output characteristics at low temperature. In order to achieve this, a cathode active
(Continued)

Crystallite Size at Surface (003) of Lithium Nickel Composite Oxide (Å)

material that is a lithium nickel composite oxide composed of secondary particles that are an aggregate of primary particles is expressed by the general expression: $Li_w(Ni_{1-x-y}Co_xAl_y)_{1-z}M_zO_2$ (where $0.98 \leq w \leq 1.10$, $0.05 \leq x \leq 0.3$, $0.01 \leq y \leq 0.1$, $0 \leq z \leq 0.05$, and M is at least one metal element selected from a group consisting of Mg, Fe, Cu, Zn and Ga), and where the crystallite diameter at (003) plane of that lithium nickel composite oxide that is found by X-ray diffraction and the Scherrer equation is within the range of 1200 Å to 1600 Å is used as the cathode material.

6 Claims, 1 Drawing Sheet

(51) Int. Cl.
 *H01M 4/525* (2010.01)
 *C01G 53/00* (2006.01)
 *H01M 10/052* (2010.01)
 *H01M 10/0525* (2010.01)

(52) U.S. Cl.
 CPC ............ *H01M 4/485* (2013.01); *H01M 4/525* (2013.01); *C01P 2002/52* (2013.01); *C01P 2002/70* (2013.01); *C01P 2002/72* (2013.01); *C01P 2006/40* (2013.01); *H01M 10/052* (2013.01); *H01M 10/0525* (2013.01); *Y02E 60/122* (2013.01); *Y02P 70/54* (2015.11)

(56) References Cited

U.S. PATENT DOCUMENTS

| | | | |
|---|---|---|---|
| 7,410,511 B2 | 8/2008 | Ozaki et al. | |
| 2005/0227147 A1* | 10/2005 | Kogetsu | H01M 4/049 429/231.95 |
| 2006/0089257 A1* | 4/2006 | Albrecht | C01G 53/006 502/335 |
| 2011/0045328 A1 | 2/2011 | Inagaki et al. | |

FOREIGN PATENT DOCUMENTS

| | | |
|---|---|---|
| JP | 08-078006 | 3/1996 |
| JP | 10-308218 | 11/1998 |
| JP | 10-310433 | 11/1998 |
| JP | 11-025957 | 1/1999 |
| JP | 11-060243 | 3/1999 |
| JP | 11-288716 | 10/1999 |
| JP | 2000-030693 A | 1/2000 |
| JP | 2000-195514 | 7/2000 |
| JP | 2000-243394 A | 9/2000 |
| JP | 2006-147591 A | 6/2006 |
| JP | 2008-214186 | 9/2008 |
| JP | 2010-064944 | 3/2010 |
| JP | 2011-096655 A | 5/2011 |
| KR | 10-507021 | 8/2005 |

OTHER PUBLICATIONS

Hwang, B.J., et al: "Effect of synthesis conditions on electrochemical properties of $LiNi_{1-y}Co_yO_2$ cathode for lithium rechargeable batteries," *Journal of Power Sources*, vol. 114 (2003) pp. 244-252.

Office Action issued by the State Intellectual Property Office of People's Republic of China in counterpart Application issued on Jul. 31, 2014.

* cited by examiner

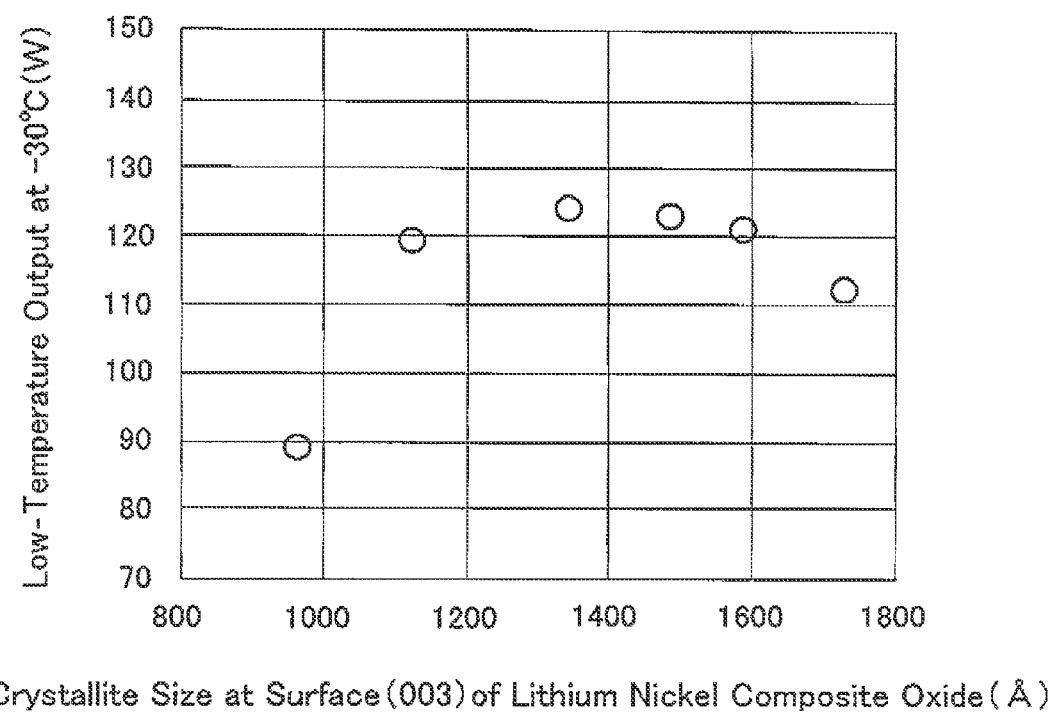

POSITIVE ELECTRODE ACTIVE MATERIAL FOR NON-AQUEOUS ELECTROLYTE SECONDARY BATTERY AND PRODUCTION METHOD FOR SAME, PRECURSOR FOR POSITIVE ELECTRODE ACTIVE MATERIAL, AND NON-AQUEOUS ELECTROLYTE SECONDARY BATTERY USING POSITIVE ELECTRODE ACTIVE MATERIAL

CROSS REFERENCES TO RELATED APPLICATIONS

This application is a division of U.S. patent application Ser. No. 13/638,171, filed on Jan. 15, 2013, which is a 371 of PCT/JP2011/057242, filed Mar. 24, 2011, and claims priority to Japan 2010-075280, filed on Mar. 29, 2010. The disclosure of the above-referenced applications is expressly incorporated herein by reference in its entirety.

TECHNICAL FIELD

The present invention relates to a non-aqueous electrolyte secondary battery, a cathode active material that is used as the cathode material in that non-aqueous electrolyte secondary battery, a manufacturing method for that cathode active material, and a precursor that is used in the manufacture of that cathode active material. More specifically, the present invention relates to cathode active material composed of a lithium nickel composite oxide, a non-aqueous electrolyte secondary battery that uses that cathode active material as the cathode, a manufacturing method for the lithium nickel composite oxide, and a nickel composite hydroxide as a precursor to the lithium nickel composite oxide.

BACKGROUND ART

In recent years, secondary batteries such as non-aqueous electrolyte secondary batteries or nickel-metal hydride batteries have become important as the power source mounted in automobiles using electricity as the driving source, or as the power source mounted in personal computers or mobile terminal and other electrical products. Particularly, it is expected that non-aqueous electrolyte secondary batteries that are lightweight and have a high energy density will be suitably used as a high output power source for use in automobiles.

In the construction of a typical lithium ion secondary battery as a non-aqueous electrolyte secondary battery, there is provided an electrode active material layers on the surface of an electrode collector that capable of reversible occlusion and discharge of lithium ions, and more specifically, there is provided a cathode active material layer and anode active material layer. For example, in the case of the cathode, cathode active material that is composed of a composite oxide that includes transition metals such as lithium, nickel and the like as metal elements are dispersed in to a suitable solvent that is composed of an aqueous solvent such as water or various kinds of organic solvent to obtain a paste-like composition or slurry-like composition (hereafter, these composition will simply be referred to as "paste"), and a cathode active material layer is formed by applying that paste to an electrode collector.

Incidentally, of the composite oxides of a cathode active material of a lithium ion secondary battery, a so-called lithium nickel composite oxide constructed with nickel as the main material: $LiNi_{1-x}M_xO_2$ (M is one kind or two or more kinds of metal elements other than nickel) has advantages over conventional lithium cobalt composite oxides in that it theoretically has greater lithium ion occlusion capacity, and it is possible to reduce the amount of costly metal material such cobalt that is used, so is gaining much attention as a suitable cathode material for the construction of a lithium ion secondary battery.

When using a lithium nickel composite oxide, which is obtained by a conventionally proposed manufacturing method, as a cathode active material, there is a problem in that even though the charge capacity and discharge capacity is higher than that of a lithium cobalt oxide, the cyclability is inferior. Moreover, when used in high-temperature environments or low-temperature environments, lithium nickel composite oxide has a disadvantage in that it is comparatively easy for the battery performance to become impaired.

In order to improve cyclability, adding or substituting different kinds of elements into the lithium nickel composite oxide is being tried. For example, JP 8-78006 (A) discloses a cathode active material that is composed of a composite oxide having layered structure and expressed by the general expression: $Li_aNi_bM^1_cM^2O_2$, where $M^1$ is Co, and $M^2$ is one or more kind of element that is selected from among at least B, Al, In and Sn.

With the cathode active material of this disclosure, the cyclability is improved, however, depending on the existence of added elements, the capable range of intercalation and deintercalation of lithium ions of the cathode active material becomes narrow, so there is a tendency for the discharge capacity to decrease. This decrease in discharge capacity is known to become particularly remarkable in heavy load conditions where the discharge current is large, or in low-temperature efficient discharge conditions where the mobility of electrolytes becomes small at low temperature.

The output characteristics at high temperature or low temperature of secondary battery are extremely important characteristics when the battery is used in equipment that is used in environments where there is a large change in temperature, and particularly when considering use an cold regions, it is necessary for the battery to have sufficient output characteristics at low temperature.

In an attempt to improve the output characteristics at low temperature, JP 11-288716 (A) discloses a cathode active material that is composed of lithium nickel cobalt oxide formed of spherical or elliptical secondary particles having an average particle size of 5 μm to 20 μm and in which primary particles are collected in a radial fashion, with this cathode active material being expressed by the general expression: $Li_xNi_yCo_{1-y}O_2$ (where $0<x<1.10$, $0.75<y<0.90$), With the cathode active material of this disclosure, uniform intercalation and deintercalation from the surface of the secondary particles to inside the crystal is possible, and a lithium ion secondary battery having high capacity, excellent heavy load characteristics and excellent low-temperature efficient discharge characteristics can be obtained. However, when the cathode active material described above is used, the surface of the secondary particles is covered by conductive materials, binding agent, or gas that is adsorbed into the surface the secondary particle during the formation of the cathode active material, so mobility of the lithium ions is obstructed, it is feasible that particularly low-temperature efficient discharge characteristics will not be sufficiently obtained.

On the other hand, in attempts to improve the large current charge and discharge characteristics, or in other words, improve the output characteristics, attention has been placed on the size of the primary particles and secondary particles of the cathode active material. For example, JP 2000-243394 (A) discloses that by keeping the ratio "D50/r" of the average length "r" in the short length direction of the primary particles, and the particle size "D" when the volume cumulative frequency of particle size distribution of secondary particles reaches 50% within a specified range, cathode active material having high discharge potential, excellent large current characteristics and good cyclability can be obtained.

The crystallinity of the cathode active material is also described, where preferably the relationship between the half width (full width at half maximum) FWHM (003) and FWHM (104) of the diffraction peaks of the (003) surface and (104) surface of the Miller indices hkl of X-ray diffraction of composite oxide that can be used as a cathode active material is $0.7 \leq$ FWHM (003) FWHM (104)$\leq 0.9$, and furthermore, preferably, $0.1° \leq$ FWHM (003)$\leq 0.16°$ and $0.13° \leq$ FWHM (104)$\leq 0.2°$.

These indicate the effect of the crystallinity of the cathode active material on the output characteristics, however, they are related to the relationship between the large charge and discharge characteristics and the relative orientation of a plurality of crystal surfaces, and there is no mention of improvement of the low-temperature output.

Moreover, JP 10-308218 (A) discloses a cathode active material for a lithium ion secondary battery that is expressed by the general expression: $LiMO_2$ (where M is at least one element selected from among the group of Co, Ni, Fe, Mn and Cr), and is composed of particles that are a collection of single crystals with minute crystallites as the unit, where the shapes of the crystallites and the particles are sterically nearly isotropic in shape, and when expressed in term of crystallites, is within the range of 500 Å (Angstroms) to 750 Å in the (003) vector direction and 450 Å to 1000 Å in the (110) vector direction.

In this disclosure, the size of the crystallites is used for expressing the sterical isotropic shape of the particles, however, there is no mention of the effect of the size of the crystallites themselves. Moreover, the object is to achieve both thermal stability during charging and good charge and discharge cyclability; and is not related to an improvement in low-temperature output.

On the other hand, attempts are being made to improve the cathode active material by placing attention on the nickel composite compound used as the raw material for the lithium nickel composite oxide, or in other words the characteristics of the precursor of the cathode active material. As the method for manufacturing the lithium nickel composite oxide, a typical method of mixing and calcining a lithium compound and a nickel composite compound that is composed of nickel, cobalt and metal elements M is used. Hydroxides, oxides, nitrates and the like are used in the nickel composite compound, however, because it is easy to control the shape, particle size and crystallinity of the materials, typically a hydroxide or an oxide that is obtained by calcining the hydroxide is used.

For example, JP 7-335220 (A) discloses manufacturing a cathode active material composed of lithium nickel oxide that is expressed by the general expression $LiNiO_2$, wherein the lithium nickel oxide is obtained by performing heat treatment in an oxidizing atmosphere of nickel hydroxide and lithium hydroxide that are formed into secondary particles that are a collection of primary particles having a particle size of 1 µm or less.

Furthermore, by using a particle structure in which the opening section of the primary particles having a layered structure of nickel hydroxide is oriented toward the outside of the secondary particles, the end surface of the generated $LiNiO_2$ layer also maintains that shape and is oriented toward the outside of the powdered particles, so intercalation and de-intercalation of Li during charging and discharging can advance smoothly.

However, in this disclosure, only the particle shape of the cathode active material that is obtained and maintaining the orientation is disclosed, and there is no mention of the effect of nickel hydroxides on the crystallinity of the cathode active material that is obtained.

Moreover, JP 11-60243 (A6) discloses a nickel hydroxide as a precursor to a cathode active material that is expressed by the general expression: $Ni_{1-y}A_x(OH)_2$ (where A is cobalt or manganese, $0.10 < x < 0.5$), and is composed of a layered body having uniform crystal orientation or a single crystal, with particle size of primary particles being 0.5 to 5 µm, and the full width at half maximum found through X-ray diffraction obtained by taking a sampling with the easiest orientation is (001)<0.3 deg., (101)<0.43 deg., and the peak intensity ratio is I (101)/I (001)<0.5.

In the case of this disclosure, the thermal characteristics during charging are improved by achieving the accretion of primary particles in the raw material stage instead of by sintering during calcination, and without a decrease in battery characteristics of the lithium ion secondary battery. However, nothing is mentioned about the crystallinity of the obtained cathode active material, or about the effect crystallinity of nickel hydroxide as a raw material, and does not mention anything about improving the low-temperature output.

Furthermore, the relationship between the battery characteristics of a cathode active material and the power characteristics of the material is being studied. For example, the applicants of this disclosure proposed in JP 2000-30693 (A) a hexagonal lithium nickel composite oxide having a layered structure that is expressed as $[Li]_{3a}[Ni_{1-x-y}Co_xAl_y]_{3b}[O_2]_{6c}$ (where the subscripts to the brackets [ ] represent sites, and x and y satisfy the conditions $0 < x \leq 0.20$, and $0 < y \leq 0.15$), and with the objective of reducing irreversible capacity, the structure is such that secondary particles are formed by collecting a plurality of primary particles of the lithium nickel composite oxide, with the average particle size of the primary particles being 0.1 µm or greater. Moreover, it is disclosed that there is a linear correlation between the average particle size of the primary particles and the crystallite diameter that is calculated from the half width of the 003 peak in the X-ray diffraction pattern, with the crystallite diameter that is calculated from the half width of the 003 peak in the X-ray diffraction pattern being 40 nm (400 Å) or greater, and more specifically, within the range of 430 Å to 1190 Å.

However, in that disclosure, regulating the powder characteristics of the battery characteristics because of its relationship to the reduction in irreversible capacity of the battery is disclosed, however, the relationship between the low-temperature output and the powder characteristic is not studied, and nothing is disclosed for improving the low-temperature output.

RELATED LITERATURE

Patent Literature

[Patent Literature 1] JP 8-78006 (A)
[Patent Literature 2] JP 11-288716 (A)
[Patent Literature 3] JP 2000-243394 (A)

[Patent Literature 4] JP 10-308218 (A)
[Patent Literature 5] JP 7-335220 (A)
[Patent Literature 6] JP 11-60243 (A)
[Patent Literature 7] JP 2000-30693 (A)

SUMMARY OF THE INVENTION

Problem to be Solved by the Invention

The object of the present invention is to provide a cathode active material for a non-aqueous electrolyte secondary battery that makes it possible to obtain a battery that has good output characteristics in a high-temperature environment or low-temperature environment, and particularly in a low-temperature environment, while at the same time is capable of maintaining battery characteristics such as the charge/discharge capacity and cyclability.

Means for Solving the Problems

In order to solve the problems described above, the inventors diligently studied improvement of the output characteristics of a non-aqueous electrolyte secondary at low temperature. As a result, it was found that by distributing pores having a certain size inside of which electrolyte can penetrate in the cathode active material, it is possible to improve the low-temperature output characteristics, and the size of the pores can be regulated by making the crystallite diameter of the lithium nickel composite oxide of the cathode active material a certain size. Furthermore, it was learned that there is a close correlation between the crystallinity of the nickel composite hydroxide as precursor and the crystallinity of the lithium nickel composite oxide that is finally obtained, and that cathode active material above can be obtained by controlling the half width (full width at half maximum) of a specified crystal surface of the nickel composite hydroxide. The inventors achieved the invention based the knowledge they gained.

In other words, the cathode active material for a non-aqueous electrolyte secondary battery of the present invention is a lithium nickel composite oxide composed of secondary particles that are an aggregate of primary particles and is expressed by the general expression: $Li_w(Ni_{1-x-y}Co_xAl_y)_{1-z}M_zO_2$ (where $0.98 \leq w \leq 1.10$, $0.05 \leq x \leq 0.3$, $0.01 \leq y \leq 0.1$, $0 \leq z \leq 0.05$, and M is at least one metal element selected from a group consisting of Mg, Fe, Cu, Zn and Ga).

Particularly, in the cathode active material for a non-aqueous electrolyte secondary battery of the present invention, the crystallite diameter at (003) plane of the lithium nickel composite oxide that is found by X-ray diffraction and the Scherrer equation is within the range of 1200 Å to 1600 Å, and preferably is within the range of 1200 Å to 1500 Å.

The precursor for obtaining the cathode active material for a non-aqueous electrolyte secondary battery of the present invention is nickel composite hydroxide expressed by the general expression: $(Ni_{1-x-y}Co_xAl_y)_{1-z}M_z(OH)_2$ (where $0.05 \leq x \leq 0.3$, $0.01 \leq y \leq 0.1$, $0 \leq z \leq 0.05$, and M is at least one metal element selected from a group consisting of Mg, Fe, Cu, Zn and Ga), and where the half width at (101) plane found by X-ray diffraction is 0.45° to 0.8°, and by mixing the precursor for obtaining a cathode active material for a non-aqueous electrolyte secondary battery with a lithium compound or by mixing the precursor after oxidizing roasting with a lithium compound, and performing calcination of the obtained mixture in an oxidizing atmosphere, the cathode active material for a non-aqueous electrolyte secondary battery of the present invention is obtained.

Moreover, preferably, the precursor is obtained by covering the surface of a hydroxide composed of Ni, Co and M given by the expression above with aluminum hydroxide.

In the manufacturing method for the cathode active material for a non-aqueous electrolyte secondary battery of the present invention, the precursor, or an oxide of the precursor that is obtained by performing oxidizing roasting of the precursor is mixed with a lithium compound and the obtained mixture is calcinated in oxidizing atmosphere to obtain a lithium nickel composite oxide. Preferably, the calcination temperature is within the range 700° C. to 760° C., and lithium hydroxide is used as the lithium compound.

In the non-aqueous electrolyte secondary battery of the present invention, a cathode active material layer, which is formed from the cathode active material for a non-aqueous electrolyte secondary battery having the composition and characteristics above, is formed on a cathode collector.

Effect of the Invention

By using the cathode active material for a non-aqueous electrolyte secondary battery of the present invention, it is possible to obtain a non-aqueous electrolyte secondary battery having good output characteristics at low temperature. The cathode active material of the present invention having such characteristics can be easily obtained by using the precursor of the present invention. Therefore, the industrial value of the present invention can be said to be very large.

BRIEF DESCRIPTION OF THE DRAWINGS

FIG. 1 is a diagram illustrating the relationship between the crystallite diameter on the (003) surface of a lithium nickel composite oxide and the −30° C. low-temperature output.

MODES FOR CARRYING OUT THE INVENTION

Charging and discharging of a lithium ion secondary batters which is a non-aqueous electrolyte secondary battery that uses a lithium nickel composite oxide as a cathode active material proceeds by lithium ion moving between the cathode active material and the electrolyte, and the lithium ions irreversibly leaving and entering the cathode active material. Therefore, the ease of movement of lithium ions during charging and discharging, or in other words, the mobility thereof largely affects the charge and discharge characteristics of a secondary battery, and particularly affects the output characteristics and rate characteristics thereof.

Movement of lithium ions can be divided into movement inside the cathode active material, movement at the boundary between the cathode active material and the electrolyte, and movement inside the electrolyte, however, movement inside the electrolyte depends on the electrolyte so it is not related to the cathode active material.

As described above, movement of lithium ions is performed through the boundary between the cathode active material and electrolyte, so the mobility of lithium ions at this boundary greatly affects the internal resistance of the battery. In other words, when the mobility of lithium ions at this boundary is low, the internal resistance becomes high, and it is not possible to display good output characteristics as a battery.

Particularly, in a low-temperature environment, the rate of diffusion of lithium into the electrolyte decreases together with the mobility of lithium ions at the boundary between the cathode active material and the electrolyte. Therefore, in order to obtain a secondary battery having high output characteristics at low temperature, it is necessary to obtain a cathode active material that has small resistance even at low temperature, or in other words, it is necessary to obtain a secondary battery that uses a cathode active material that has high mobility of lithium ions at this boundary.

The mobility of lithium ions at the boundary between the cathode active material and the electrolyte depends on the insertion and extraction of lithium ions from the surface of the cathode active material, however, as long as the insertion and extraction per unit area is the same, the mobility depends on the surface area at this boundary. In other words, the larger the surface area of the surface of the cathode active material is, the larger the contact area between the cathode active material and the electrolyte becomes, which is advantageous for the movement of lithium ions during charging and discharging.

Here, the surface area of the cathode active material surface means the surface area of the portion that comes in contact with the electrolyte. In other words, the area of portions of minute pores is included in the surface area when the surface area is measured by the nitrogen adsorption method or the like, however, there is a possibility that the electrolyte cannot penetrate into the portions of minute pores and therefore the portions may not contribute to the contact with the electrolyte, so the area of such portions is excluded. Therefore, it can be said that in order to obtain a battery with good output characteristics, the cathode active material needs to contain many pores having a certain size into which the electrolyte can penetrate.

In case that the cathode active material is composed of secondary particles that are an aggregate of primary particles and the primary particles are fine particles, many pores that exist between the primary particles are widely distributed in the cathode active material, however, these pores are minute, so the electrolyte cannot penetrate into these pores, and thus the surface area that can come in contact with the electrolyte does not increase.

Together with increasing the size of the primary particles, the diameter of the pores that exist between primary particles becomes larger and the percentage of the pores through which electrolyte can penetrate increases, however, it is presumed that the number of pores that are distributed becomes small. Furthermore, when the primary particles become too coarse, the percentage of space occupied by pores in the particles greatly decreases, which causes the penetration paths of electrolyte to decrease, so this causes a drop in output characteristics. Therefore, by making the size of the primary particle within a certain range, and creating many pores through which the electrolyte can penetrate, it is possible to increase the surface area that can come in contact with the electrolyte.

As an index of the size of the primary particles inside the cathode active material, the average particle size of primary particles can be used, however, the single crystals of the primary particles increase and so the particle size of the primary particles also increases, so the crystallite diameter, which is an index of the size of the single crystals, is suitable. By making the primary particles a certain size, the size of the pores between primary particles becomes larger, and penetration paths of the electrolyte to penetrate into the cathode active material are secured, and thus it becomes possible for the primary particles exiting inside the cathode active material to come in contact with the electrolyte.

On the other hand, in order to increase the area of contact of the cathode active material with the electrolyte, it is also necessary to make the surface area of the primary particles themselves greater. In other words, by securing the penetration paths for the electrolyte to penetrate into the cathode active material, the number of primary particles that can come in contact with the electrolyte is increased, and by increasing the surface area of each individual primary particles, it is possible to greatly increase the surface area of the cathode active material with which the electrolyte comes in contact.

By making the single crystals of the primary particles larger, the particle size of the primary particles is increased and the penetration paths for the electrolyte are secured, and by creating relatively large unevenness on the surface of the primary particles, it is possible to increase the effective surface area. This is because primary particles are considered to be composed of single crystals, and as the single crystals become larger, the difference in the particle size between single crystals that are exposed on the surface becomes larger, and as a result, it is conceivable that the size of the unevenness on the surface of the primary particles will become larger. By uses the crystallite diameter as an index in this way, it is possible to evaluate both the securing of penetration paths for the electrolyte, and the effective surface are of the primary particles.

The crystallite diameter is normally found by Scherrer calculation given by equation (1) below. The crystal surface that is used in the calculation can be arbitrarily selected, however, in the ease of lithium nickel composite oxide, the surface (00n), which is a plane direction that is perpendicular to the layers of the layered structure through which lithium ions intercalate, is appropriately applied because the peak strength of the X-ray diffraction pattern is large, and furthermore, (003) plane having a particularly strong peak strength is more appropriately applied.

$$D = 0.9\lambda/\beta \cos\theta \qquad (1)$$

D: Crystallite diameter (Å)

$\beta$: Spread of the diffraction peak due to the crystallite size (rad)

$\lambda$: X-ray wavelength [CuK$\alpha$] (Å)

$\theta$: Diffraction angle (°)

In the present invention, the crystallite diameter at (003) plane of the lithium nickel composite oxide that was found through X-ray diffraction and the Scherrer equation is controlled so as to be in the range 1200 Å to 1600 Å and preferably 1200 Å to 1500 Å. When the crystallite diameter at (003) plane of the lithium nickel composite oxide is less than 1200 Å, the primary particles are fine, and thus the pores existing between the primary particles inside the cathode active material becomes minute, so it becomes impossible for the electrolyte to penetrate into the cathode active material, and thus sufficient contact area with the electrolyte cannot be obtained. On the other hand, when the crystallite diameter at (003) plane is greater than 1600 Å, the primary particles become to coarse, and the percentage of space that the pores occupy inside the secondary particles is greatly decreased, so the penetration paths for the electrolyte are decreased, and thus sufficient contact area with the electrolyte cannot be obtained. Therefore, when the crystallite diameter is less than 1200 Å or greater than 1600 Å, the contact area with the electrolyte is decreased, so the output characteristics are decreased. Furthermore, it is possible to obtain the objective low-temperature output within the range of 1200 Å to 1600 Å, however, within the range of 1200 Å to 1500 Å, the output becomes flat, so in order to obtain stable low-temperature output, a crystallite diameter within this range is preferred.

The particle size of the primary particles is correlated with the crystallite diameter at (003) plane, and by controlling the crystallite diameter within the range above, it is possible to control the particle size of the primary particles so as to be in the preferred state. Moreover, preferably the particle size of the secondary particles is such that the average particle size according to the laser diffraction scattering method is 5 µm to 20 µm, and particularly, 7 µm to 12 µm.

The cathode active material of the present invention is composed of hexagonal crystals of lithium nickel composite oxide having a layered structure, however, in order to improve the thermal stability of the lithium nickel composite oxide, Co and Al are further added with a range that sufficient capacity can be obtained. More specifically, Co and Al are added so that the mole ratio with respect to the total amount of Ni, Co and Al is 0.05 to 0.3, and preferably; 0.1 to 0.2 for Co, and 0.01 to 0.1, and preferably 0.02 to 0.05 for Al.

Furthermore, in order to improve the battery characteristics, as the added element (M), at least one or more metal element selected from a group consisting of Mg, Fe, Cu, Zn and Ga is added at a mole ratio of 0.05 or less with respect to the total metal elements other than Li.

In the present invention, the precursor, which is the raw material of the cathode active material above, is a nickel composite hydroxide that is expressed by the general expression; $(Ni_{1-x-y}Co_xAl_y)_{1-z}M_z(OH)_2$ (where $0.05 \leq x \leq 0.3$, $0.01 \leq y \leq 0.1$, $0 \leq z \leq 0.05$, and M is at least one metal element selected from a group consisting of Mg, Fe, Cu, Zn and Ga), with the half width (full width at half maximum) at (101) plane by X-ray diffraction of the nickel composite hydroxide being 0.45° to 0.8°. The structure of this precursor is the same as that of the cathode active material that is obtained using this precursor, and is already composed of secondary particles that are formed by an aggregate of primary particles.

From the aspect of improving the output characteristics, the precursor is preferably such that the surface of the hydroxide composed of Ni, Co and M as given in the expression above is covered by aluminum hydroxide.

The crystallite shape of the lithium nickel composite oxide of the cathode active material and that of the nickel composite hydroxide, which is a precursor, are correlated, and as the crystallinity of the nickel composite hydroxide becomes high, the crystallinity of the obtained lithium nickel composite oxide becomes high, and the crystallite diameter also becomes larger. The lithium nickel composite oxide is formed by lithium penetrating into the nickel composite hydroxide during calcination. Therefore, the crystallinity that is expressed by the half width of the nickel composite hydroxide, or in other words the crystallite diameter thereof, is also maintained in the lithium nickel composite oxide, and by using a nickel composite hydroxide having high crystallinity, it is possible to obtain a lithium nickel composite oxide having large crystallites.

In other words, by using a nickel composite hydroxide, whose half width at (101) plane found by X-ray diffraction is 0.45° to 0.8°, as a precursor, it is possible to obtain a lithium nickel composite oxide whose crystallite diameter at (003) plane is 1200 Å to 1600 Å. When the half width at (101) plane by X-ray diffraction of the nickel composite hydroxide is less than 0.45°, the crystallite diameter of the lithium nickel composite oxide becomes greater than 1600 Å. On the other hand, when the half width exceeds 0.8°, the crystallite diameter of the lithium nickel composite oxide becomes less than 1200 Å. Moreover, when the temperature during calcination is increased in order to increase the crystallite diameter to 1200 Å or more when using a nickel composite hydroxide having a half width that is greater than 0.8°, sintering of the secondary particles occurs and the secondary particles become coarse, so the battery characteristics of the cathode active material that is obtained decrease. Therefore, in order to keep the crystallite diameter of the lithium nickel composite oxide within the range of 1200 Å to 1500 Å, the half width of the nickel composite hydroxide is preferably kept within 0.5° to 0.8°.

The crystal characteristics of the nickel composite hydroxide are found by X-ray diffraction in the same was for the lithium nickel composite oxide, however, in the present invention, the reason that the (101) plane was used is that half width at (101) plane changes a large amount due to the manufacturing conditions, and particularly due to the crystallization reaction conditions. It is possible to use the half width of a crystal plane other than (101) plane as an index, however, the change due to manufacturing conditions is small, and there is a possibility that it will not be possible to sufficiently control the crystallize size of the cathode active material that is obtained.

The manufacturing method for the cathode active material of the present invention is characterized by the precursor, or the precursor oxide that is obtained by oxidizing roasting of that precursor, and the calcination performed in an oxidizing atmosphere after mixing with a lithium compound.

The manufacturing method for the precursor uses known technology (coprecipitation method or the like) for obtaining a metal hydroxide by neutralizing a metal salt aqueous solution, and the precursor is obtained by controlling the Ni solubility according to the pH, temperature, $NH_3$ concentration and the like of the reaction solution during the neutralization reaction.

In addition to nickel sulfate as the nickel salt of raw material, it is possible to use nickel chloride, nickel nitrate or the like, as the cobalt salt, in addition to cobalt sulfate, it is possible to use cobalt chloride, cobalt nitrite or the like, and as the M metal salt, it is possible to use the sulfate, a chloride, a nitrite or the like of that metal.

The conditions may change due to the manufacturing apparatus and the scale, however, specifically when using nickel sulfate as the nickel salt, for example, the precursor above is obtained by controlling the Ni solubility of the reaction solution to be preferably 25 ppm to 100 ppm by mass, and more preferably 30 ppm to 80 ppm by mass by making the pH during the neutralization reaction to preferably greater than 10 and less than 11.5, and more preferably between 10.6 and 11.0, the temperature to be preferably 40° C. to 55° C., and more preferably, 45° C. to 55° C., and the $NH_3$ concentration of the reaction solution to be 5 g/L to 20 g/L.

When the Ni solubility of the reaction solution is less than 25 ppm by mass, the amount of nuclei generated during the crystallization reaction increases, and the half width at (101) plane of the obtained nickel composite hydroxide may exceed 0.8°. Moreover, when the Ni solubility exceeds 100 ppm by mass, crystal growth during the crystallization reaction is promoted, and the half width at (101) plane may become less than 0.45°.

On the other hand, when the Ni solubility of the reaction solution is controlled by the pH, temperature and $NH_3$ concentration of the reaction solution during the neutralization reaction, and nickel sulfate is used as the nickel salt, the Ni solubility becomes less than 25 ppm by mass when the pH becomes 11.5 or greater, or the temperature becomes less than 40° C., or the NH$_3$ concentration in the reaction solution becomes less than 5 during the neutralization reaction. Moreover, the Ni solubility of the reaction solution becomes greater than 100 ppm by mass when the pH becomes 10 or less, or the temperature becomes greater than 55° C., or the NH$_3$ concentration in the reaction solution becomes greater than 20 g/L during the neutralization reaction. When any one of the reaction conditions shifts from the specified value, the Ni solubility of the reaction solution shifts from the specified range, and in any case it is not possible to obtain a nickel composite hydroxide having the preferred crystallinity as the precursor for obtaining a cathode active material having excellent battery characteristics.

The reaction conditions above are an example, and the even when the half width at (101) plane exceeds the range above in those conditions due to effects of the manufacturing apparatus and the scale of that apparatus, by referencing the relationship between the conditions above and the half width at (101) plane, it is possible to easily adjust the half width at (101) plane according to those conditions.

As a manufacturing method for manufacturing the precursor above, there is a coprecipitation method in which a mixed salt solution that includes a nickel salt, cobalt salt and M metal salt at specified ratios, and alkali aqueous solution are supplied to a reaction solution, such as pH regulated water so that the pH can be kept constant, and hydroxides of the nickel, cobalt and M metal are precipitated out. The ratios of the Ni, Co and M the mixed salt solution can be determined according to the composition ratios in the lithium nickel composite oxide that is to be finally obtained as the cathode active material.

As described above, the nickel cobalt composite hydroxide that is obtained is secondary particles that are an aggregate of primary particles, however, preferably the shape of the secondary particles is spherical, and the secondary particles are adjusted so that the average particle size found from laser diffraction scattering is 5 μm to 20 μm. The shape of the particles and the average particle size can be controlled by the mixing rate of the mixed salt solution and the alkali aqueous solution, and the coprecipitation conditions.

Manufacturing of the nickel cobalt composite hydroxide is preferably by the coprecipitation method described above, however, in addition to that, the precursor above composed of secondary particles that are formed by an aggregate of primary particles can be obtained by a method of manufacturing a nickel hydroxide by a crystallization method, and then causing cobalt hydroxide to precipitate on the surface of that nickel hydroxide, or by a method of pulverizing manufactured nickel cobalt composite hydroxide particles and obtaining the target particle size by the spray drying method.

The nickel cobalt hydroxide that is obtained is filtered, washed and dried, however, these processes can be performed by normal methods.

The precursor above can also be a nickel composite hydroxide that contains Al and that is obtained by neutralizing a mixed salt solution that includes Al, however, in order to make the amount of Al contained in the each particle uniform, preferably, after the nickel composite hydroxide is obtained, that nickel composite hydroxide is covered by aluminum hydroxide.

For example, by making the nickel composite hydroxide a slurry, it is possible to cover the nickel composite hydroxide with aluminum hydroxide by adding an aqueous solution that contains an aluminum salt such as sodium aluminate, and mixing the slurry while adjusting the pH. Moreover, it is also possible to mix an aqueous solution containing a desired concentration of aluminum salt such as sodium aluminate to the slurry, and then adjust the pH and cause the aluminum hydroxide to adsorb into the surface of the particles of the nickel composite hydroxide.

The cathode active material of the present invention can be obtained by mixing the precursor obtained using the crystallization method above, or mixing an oxide of the precursor that is obtained by performing oxidizing roasting of that precursor with lithium, and then performing calcination in an oxidizing atmosphere.

By performing oxidizing roasting of the precursor, it is possible to improve the reactivity with lithium. In that case, the reaction with Li sufficiently advances in a short time, so it is possible to improve productivity. The oxidizing roasting temperature is preferably 650° C. to 750° C., and more preferably 700° C. to 750° C. When the temperature is less than 650° C., the oxide film that is formed on the surface is not sufficient, and when the temperature exceeds 750° C., the surface area is too small, so the reactivity with Li decreases, which is not desirable.

The oxidizing roasting atmosphere can be a non-reduced atmosphere with no problem, however, an air atmosphere or oxygen atmosphere is preferred. The oxidizing roasting time and the furnace used for processing are not particularly limited, and can be appropriately set according to the amount being processed and the oxidizing roasting temperature.

Mixing of the lithium compound is performed by mixing the precursor or an oxide of the precursor with lithium compound at the composition ratio of the lithium nickel composite oxide that will finally be obtained as the cathode active material.

Mixing can be performed by using a dry mixer or granulator such as a V blender, a Spartan granulator, Lodige mixer, Julia mixer, or vertical granulator, and preferably mixing is performed in a suitable time range for uniform mixing.

Calcination is not particularly limited and can be performed using a normal method and apparatus, however, the temperature during calcination is preferably 700° C. to 760° C., and more preferably 740° C. to 760° C. When the temperature during calcination is less than 700° C., crystallinity of the lithium nickel composite oxide of the cathode active material is not sufficiently developed, and there is a possibility that the crystallite diameter at (003) plane will be less than 1100 Å. Moreover, when the temperature during calcination exceeds 760° C., not only does the crystallite diameter at (003) plane of the lithium nickel composite oxide exceed 1600 Å, there is also a possibility that sintering of the secondary particles of the lithium nickel composite oxide will occur and that that secondary particles will become coarse.

The calcination time is also not particularly limited, and as long as the reaction described above proceeds sufficiently any amount of time is fine, however, preferably 1 to 10 hours is preferred. The oxidizing atmosphere is also not particularly limited, however, in order that the crystallinity of the lithium nickel composite oxide is sufficiently developed, an oxygen atmosphere that contains oxygen at 60% to 100% by volume is preferred.

Moreover, when the rate of temperature increase to the calcination temperature is too fast, the lithium compound and the precursor hydroxide will separate, which is not desirable, and when the rate is too slow, productivity worsens, so a rate of about 2° C./min to 5° C./min is realistic.

The lithium compound is not particularly limited, however, preferably is a lithium hydroxide or hydrate thereof. Lithium hydroxide has a low melting temperature and melts in the calcination temperature range above, and the reaction is liquid phase-solid phase reaction, so it can react sufficiently with a nickel composite hydroxide. When lithium carbonate is used, the lithium carbonate does not melt in the calcination temperature range above, so there is a possibility that it will not react sufficiently with the nickel composite hydroxide.

The non-aqueous electrolyte secondary battery of the present invention comprises a cathode active material layer that is formed using on the cathode active material above and layered on a cathode collector.

(a) Cathode

A cathode for a non-aqueous electrolyte secondary battery is manufactured such as described below using the cathode active material for a non-aqueous electrolyte secondary battery described above.

First, powdered cathode active material, a conductive material, and binding agent are mixed together, then a solvent, and preferably a water based solvent is added, and these are mixed and kneaded to form a cathode mixture paste. The mixture ratios in the cathode mixture paste are an important factor for setting the performance of the non-aqueous electrolyte secondary battery. When the entire mass of the solid content of the cathode mixture with the solvent removed is taken to be 100 parts by mass, as in the ease of a typical cathode for a non-aqueous electrolyte secondary battery, preferably the content of the cathode active material is 80 to 95 parts by mass, the content of the conductive material is 2 to 16 parts by mass, and the content of the binding agent is 1 to 20 parts by mass.

The obtained cathode mixture paste is applied to the surface of a collector made of aluminum foil, dried and the solvent is dispersed. As necessary, pressure may be applied by a roll press to increase the electrode density. A sheet shaped cathode can be made in this way. The sheet shaped cathode is cut to an appropriate size according to the intended battery and provided for manufacturing the battery. The method for manufacturing the cathode is not limited to that described in this example, and can be manufactured by other methods as well.

When manufacturing the cathode, it is possible to use graphite (natural graphite, man-made graphite, expanded graphite, or the like), or a carbon black material such as acetylene black or Ketchen black.

The binding agent serves the role of holding together the active material particles, and is preferably a water-soluble polymer material that can dissolve in water. For example, a hydrophilic polymer such as carboxymethyl cellulose (CMC), methyl cellulose (MC), cellulose acetate phthalate (CAP), hydropropyl methyl cellulose (HPMC), hydropropyl methyl cellulose phthalate (HPMCP), polyvinyl alcohol (PVA), polyethylene oxide (PEO) can be used. Moreover, a water dispersible polymer can also be used. For example, a fluorine-based resin such as polytetrafluoroethylene (PTFE), tetrafluoroethylene perfluoro alkyl vinyl ether copolymer (PEP), ethylene-tetrafluoroethylene copolymer (ETFE), vinyl acetate copolymer, styrene butadiene block copolymer (SBR), acrylic acid SBR resin (SBR latex), a rubber such as gum arabic or the like can be used. Of these, a fluorine-based resin such as PTFE is preferred.

The water based paste can be prepared by adding the cathode active material of the present invention, and the conductive material and binding agent described above to a suitable water based solvent as additives, then dispersing or dissolving these additive in the solvent and mixing.

The prepared paste is applied to a cathode collector, then after the water based solvent is volatilized and the paste is dried, the paste is compressed. Typically, by using a coating apparatus (coater), the paste for forming a cathode active material layer can be applied to the surface of the collector at a specified thickness. The thickness of the applied paste is not particularly limited, and can be appropriately set according to the shape and usage of the cathode and battery. For example, paste is applied to the surface of a foil that is 10 µm to 80 µm thick, so that after drying the thickness is 5 µm to 100 µm. After the paste has been applied, the coating is dried using a suitable dryer, to form a cathode active material layer having a specified thickness on the surface of the collector. By pressing as desired the cathode active material layer that was obtained in this way, it is possible to obtain a cathode sheet having the intended thickness.

(b) Anode

For the anode, an anode that is formed by mixing a binding agent with an anode active material such as metallic lithium or lithium alloy, or a material in which lithium ions can be adsorbed or desorbed, adding a suitable solvent to form a paste-like anode mixture, applying this anode mixture to the surface of a metal foil collector such as a copper collector and drying, then as necessary compressing to increase the electron density is used.

As the anode active material, it is possible to use a carbon material such as natural graphite, man-made graphite, graphitized carbon, or a combination of these.

(c) Separator

A separator is placed in between the cathode and the anode. The separator separates the cathode and the anode, and holds the electrolyte, and can be a thin film such as polyethylene, polypropylene or the like, having a lot of micropore.

(d) Non-Aqueous Electrolyte

The non-aqueous electrolyte is an electrolyte made by dissolving a lithium salt as a supporting electrolyte in an organic solvent.

As the organic solvent one type alone or a mixture of two types or more selected from among (1) a cyclic carbonate such as ethylene carbonate, propylene carbonate, butylene carbonate, trifluoro propylene carbonate and the like; (2) a chain-shaped carbonate such as diethyl carbonate, dimethyl carbonate, ethyl methyl carbonate, dipropyl carbonate and the like; (3) an ether compound such as tetrahydrofuran, 2-methyltetrahydrofuran, dimethoxyethane and the like; (4) a sulfur compound such as ethyl methyl sulfone, butane sulfone and the like; (5) and a phosphorus compound such as triethyl phosphate, trioctyl phosphate and the like.

As the supporting electrolyte, it is possible to use $LiPF_6$, $LiBF_4$, $LiClO_4$, $LiAsF_6$, $LiN(CF_3SO_2)_2$ and the like, and compounds of these. The concentration of the supporting electrolyte can be the same as that of an electrolyte used in a conventional lithium ion secondary battery, and is not particularly limited. It is possible to use an electrolyte that contains a suitable lithium compound (supporting electrolyte) at a concentration of 0.1 mol/L to 5 mol/L.

Furthermore, the non-aqueous electrolyte can also include a radical scavenger, a surfactant, a flame retardant and the like.

(e) Battery Shape and Construction

The shape of a non-aqueous electrolyte secondary battery of the present invention that is composed of the cathode, anode and separator explained above can be various shapes such as a cylindrical type, laminated type and the like.

Regardless of the shape used, the cathode and the anode are laminated by way of the separator to form electrodes, and the non-aqueous electrolyte is impregnated into the obtained electrodes, power collection leads are used to connect between the cathode current collector and the cathode terminal that extends to the outside, and between the anode current collector and the anode terminal that extends to the outside, then sealed in a battery case to complete the non-aqueous electrolyte secondary battery.

The non-aqueous electrolyte secondary battery of the present invention uses as a cathode active material the cathode active material for a non-aqueous electrolyte secondary battery of the present invention having crystallinity where the crystallite diameter at (003) plane that is found by X-ray diffraction and the Scherrer equation to be within the range 1200 Å to 1600 Å, so, for example, the low-temperature output in a low-temperature environment of −30° C. is improved by 20% or more when compared with a conventional non-aqueous electrolyte secondary battery.

EXAMPLES

In the examples described below, a non-aqueous electrolyte secondary battery, in which a cathode active material that is manufactured so that the crystallinity of the lithium metal composite oxide, or more specifically, the crystallite diameter at (003) plane is adjusted to a suitable size is used as the cathode active material, was manufactured, and the performance was evaluated.

Example 1

(1) Cathode Active Material

First, the cathode active material was manufactured by the following method. In other words, nickel sulfate ($NiSO_4$) used as a nickel supply source and cobalt sulfate ($CoSO_4$) used as a cobalt supply source were mixed so that the mole ratio Ni:Co became 85:15, and a mixed nickel cobalt salt solution having a total of nickel and cobalt of 104.5 g/L was prepared.

Next, as the reaction solution, the mixed salt solution above, 25% by mass ammonia hydroxide ($NH_3$) aqueous solution and 25% by mass sodium hydroxide aqueous solution (NaOH) were added to pure water that was adjusted to a temperature of 50° C. and a pH of 11 at this temperature, and while maintaining the solution at that temperature and pH at this temperature, the solution was supplied a little at a time to crystallize the nickel cobalt composite hydroxide to form a nickel cobalt composite hydroxide slurry. The Ni solubility of the reaction solution during crystallization was measured and found to be 40 ppm by mass. Moreover, the $NH_3$ concentration of the reaction solution during crystallization was constant at nearly 10 g/L. This slurry was washed, filtered and then dried at approximately 70° C. to obtain a nickel cobalt composite hydroxide ($Ni_{0.85}Co_{0.15}(OH)_2$) powder.

The nickel cobalt composite hydroxide is dispersed into an aqueous solution, in which sodium hydroxide (NaOH) and 20 g/L of sodium aluminate ($NaAlO_2$) have been dissolved, to prepare a slurry, then while stirring, the slurry is neutralized with a sulfuric acid aqueous solution ($H_2SO_4$), and aluminum hydroxide is caused to precipitate out onto the surface of the nickel cobalt composite hydroxide. Nearly the entire amount of the sodium aluminate was precipitated out as aluminum hydroxide. The slurry was then washed, filtered and dried at approximately 100° C., and then heated in an air atmosphere at 700° C. for 5 hours, and by performing oxidizing roasting, a nickel cobalt aluminum composite oxide ($Ni_{0.82}Co_{0.15}Al_{0.03}O$) was formed.

In order to evaluate the crystallinity, the half width at (101) plane of the obtained nickel cobalt aluminum composite oxide was measured using an X-ray diffractometer (X'Pert PRO, manufactured by PANalytical) and found to be 0.662°. The result is given in Table 1.

Next, lithium hydroxide (LiOH) as a lithium supply source is mixed with the nickel cobalt aluminum composite hydroxide above so that the mole ratio of Li and all of the other metal element (Ni, Co, Al) Li(Ni+Co+Al) becomes 1.05, to prepare raw material mixture for a lithium nickel composite oxide. After the raw material mixture was prepared, that raw material mixture was calcinated in an oxygen atmosphere at 750° C. for 7 hours to form a lithium nickel composite oxide ($Li_{1.04}(Ni_{0.82}Co_{0.15}Al_{0.03})O_2$) and obtain the cathode active material.

The half width at (003) plane of the obtained cathode active material was measure in the same way using an X-ray diffractometer, and by performing Scherrer calculation using the obtained half width at (003) plane, the crystallite diameter at (003) plane was found to be 1346 Å. This result is given in Table 1.

(2) Non-Aqueous Electrolyte Secondary Battery (Lithium Ion Secondary Battery)

(2-1) Cathode

Using the obtained cathode active material, a water based paste was prepared. In other words, when forming the cathode active material layer on the cathode, the cathode active material, acetylene black as the conductive material, and carboxymethyl cellulose (CMC) and polytetrafluoroethylene (PTFE) as the binding agent were mixed until the mass ratios of these materials became 88:10:1:1, and these materials were added to a water based solvent (ion-exchanged water) so that the solid content of the material became 54% by mass. Next, the materials were mixed for 50 minutes using a planetary mixer, and the water based paste for the cathode active material layer was obtained.

Next, the obtained water based paste is applied to both surfaces of aluminum foil having a thickness of 15 μm as the cathode collector so that the total applied amount (solid content) was 9.5 g/cm². After the moisture content of the applied paste was dried, the paste was pressed into a sheet shape by a roller press so that the layer thickness (entire thickness including the thickness of the cathode collector) was 60 μm, and by forming a cathode active material layer, a cathode (cathode sheet) for a lithium ion secondary battery was created.

(2-2) Anode

Graphite (coated with amorphous carbon) used as the anode active material, styrene-butadiene rubber (SBR) and carboxymethyl cellulose (CMC) used as the binding agent were mixed with ion-exchanged water so that that ratios of these materials was 98:1:1, and a paste for forming an anode active material layer was prepared.

Next, the paste was applied to both surfaces of copper foil having a thickness of 10 μm as the anode collector so that the total amount of applied paste (solid content) was 9.0 g/cm². After the moisture content in the applied paste was dried, an anode (anode sheet) for a lithium ion secondary battery was made by pressing the paste into a sheet shape with a roll press to a thickness (total thickness including the thickness of the anode collector) of 60 μm to form an anode active material layer.

(2-3) Lithium Ion Secondary Battery

The cathode sheet and the anode sheet were layered together with two porous separators and wound, and by pressing from the laminated direction, an electrode structure was formed into a flat shape. Next, the electrode structure was housed in a battery case, and a non-aqueous electrolyte formed by dissolving a supporting electrolyte $LiPF_6$ having a concentration of 1 mol/L in to a mixed solvent of ethylene carbonate (EC) and dimethyl carbonate (DMC) at a volume ratio of 1:1 filled into the case. After that, collector leads that extend to the outside where connected between the cathode collector and anode collector, and the battery case was sealed to make the lithium ion secondary battery.

(2-4) Evaluation

Evaluation was performed by investigating the output characteristics of the lithium ion secondary battery above in low-temperature conditions. In other words, after constant current discharge at a temperature of 25° C. to a voltage of 3.0 V, charging was performed at a constant current and constant voltage to prepare a 40% SOC (State of Charge). After that, at −30° C., the current was appropriately changed and the voltage was measure 2 seconds after the start of discharge, to create a I-V characteristic graph of the sample battery was created. The discharge cut voltage was taken to be 2.0 V. From this I-V characteristic graph the output value (W) was found to be 124 W. The evaluation results are given in Table 1.

Example 2

Except that the pH during crystallization of the nickel cobalt composite hydroxide was adjusted to 10.5, the cathode active material was obtained in the same way as in Example 1 and evaluated. The Ni solubility of the slurry during crystallization was 80 ppm by mass. The half width at (101) plane of the precursor was 0.471°, the crystallite diameter at (003) plane of the cathode active material was 1589 Å, and the output value at −30° C. of the lithium ion secondary battery was 121 W. The results are all given in Table 1.

Example 3

Nickel sulfate ($NiSO_4$) as the nickel supply source, cobalt sulfate ($CoSO_4$) as the cobalt supply source, and magnesium sulfate ($MgSO_4$) as a Mg supply source were mixed to a mole ratio Ni:Co:Mg of 83:14:3, and a nickel cobalt magnesium mixed salt water solution was prepared so that the total of nickel, cobalt and magnesium was 106.3 g/L.

Next, pure water that was prepared at a temperature of 50° C. and pH of 11 at this temperature as a reaction solution, the mixed salt solution above, 25% by mass ammonia aqueous solution ($NH_3$) and 25% by mass sodium hydroxide aqueous solution (NaOH) were supplied a little at a time to the pure water, and while maintaining the above temperature and the pH at this temperature, crystallization of the nickel cobalt magnesium composite hydroxide was performed to prepare a nickel cobalt magnesium composite hydroxide slurry. The Ni solubility during crystallization was measured and found to be 35 ppm by mass. Moreover, the $NH_3$ concentration of the reaction solution during crystallization was nearly constant at 10 g/L. This slurry was washed and filtered, then dried at approximately 70° C. to obtain a nickel cobalt magnesium composite hydroxide ($Ni_{0.83}Co_{0.14}Mg_{0.03}$(OH)$_2$) powder.

The nickel cobalt magnesium composite hydroxide was dispersed in an aqueous solution, in which sodium hydroxide (NaOH) and 20 g/L of sodium aluminate ($NaAlO_2$) were dissolved, to prepare a slurry, then the slurry was neutralized while stirring with sulfuric acid aqueous solution ($H_2SO_4$), and the aluminum hydroxide was precipitated out onto the surface of the nickel cobalt magnesium composite hydroxide. Nearly the entire amount of sodium aluminate was precipitated out as aluminum hydroxide. This slurry was then washed, filtered and dried at approximately 100° C., after which oxidizing roasting was performed by heating at 700° C. in an air atmosphere for 5 hours, to form a nickel cobalt magnesium aluminum composite oxide ($Ni_{0.81}Co_{0.13}Mg_{0.03}Al_{0.03}O$).

Except for using this nickel cobalt magnesium aluminum composite oxide, the cathode active material was obtained and evaluated in the same way as in Example 1. The half width at (101) plane of the precursor was 0.508°, the crystallite diameter at (003) plane of the cathode active material was 1490 Å, and the output value at −30° C. of the lithium ion secondary battery was 122 W. The results are all given in Table 1.

Comparative Example 1

Except for adjusting the pH during crystallization of the nickel cobalt composite hydroxide to a pH of 12.5, the cathode active material was obtained and evaluated in the same way as in Example 1. The Ni concentration of the slurry during crystallization was 10 ppm by mass. The half width at (101) plane of the precursor was 0.958°, the crystallite diameter at (003) plane of the cathode active material was 967 Å, and the output value at −30° C. of the lithium ion secondary battery was 89 W. The results are all given in Table 1.

Comparative Example 2

Except for adjusting the pH during crystallization of the nickel cobalt composite hydroxide to a pH of 10, the cathode active material was obtained and evaluated in the same way as in Example 1. The Ni concentration of the slurry during crystallization was 200 ppm by mass. The half width at (101) plane of the precursor was 0.389°, the crystallite diameter at (003) plane of the cathode active material was 1728 Å, and the output value at −30° C. of the lithium ion secondary battery was 112 W. The results are all given in Table 1.

Comparative Example 3

Except for adjusting the pH during crystallization of the nickel cobalt composite hydroxide to a pH of 11.5, the cathode active material was obtained and evaluated in the same way as in Example 1. The Ni concentration of the slurry during crystallization was 20 ppm by mass. The half width at (101) plane of the precursor was 0.846°, the crystallite diameter at (003) plane of the cathode active material was 1123 Å, and the output value at −30° C. of the lithium ion secondary battery was 119 W. The results are all given in Table 1.

TABLE 1

|  | Half Width at (101) Plane of Compoiste hydroxide (°) | Crystallite Diameter at (003) Plane of Lithium Nickel Composite Oxide (Å) | Low-Temperature Output (W) |
| --- | --- | --- | --- |
| Example 1 | 0.662 | 1346 | 124 |
| Example 2 | 0.471 | 1589 | 121 |
| Example 3 | 0.508 | 1490 | 123 |
| Comparative Example 1 | 0.958 | 967 | 89 |

TABLE 1-continued

| | Half Width at (101) Plane of Compoiste hydroxide (°) | Crystallite Diameter at (003) Plane of Lithium Nickel Composite Oxide (Å) | Low-Temperature Output (W) |
|---|---|---|---|
| Comparative Example 2 | 0.389 | 1728 | 112 |
| Comparative Example 3 | 0.846 | 1123 | 119 |

EVALUATION

FIG. 1 illustrates the relationship between the crystallite diameter at (003) plane of the cathode active material and the low-temperature output at −30° C., and it can be seen that there is a correlation between the crystallite diameter at (003) plane and the low-temperature output at −30° C. In other words, in order to achieve stable high low-temperature output, it is necessary for the crystallite diameter at (003) plane to be within the range 1200 Å to 1600 Å. Moreover, from Table 1 it is understood that it is necessary for the half width at (101) plane of the nickel composite hydroxide to be within the range 0.45° to 0.8°.

What is claimed is:

1. A precursor of a cathode active material for a non-aqueous electrolyte secondary battery, comprising:
    a nickel composite hydroxide expressed by the general expression:

$(Ni_{1-x-y}Co_xAl_y)_{1-z}M_z(OH)_2$ where $0.05 \leq x \leq 0.3$, $0.01 \leq y \leq 0.1$, $0 < z \leq 0.05$, and M is at least one metal element chosen from Mg, Fe, Cu, Zn and Ga,
        where the precursor is composed of secondary particles formed by an aggregate of primary particles, and
        where a half width at (101) plane found by X-ray diffraction of the nickel composite hydroxide is 0.45° to 0.8°.

2. The precursor of a cathode active material for a non-aqueous electrolyte secondary battery according to claim 1, wherein the precursor is obtained by covering the surface of a hydroxide composed of Ni, Co and M given by the expression above with aluminum hydroxide.

3. The precursor of a cathode active material for a non-aqueous electrolyte secondary battery according to claim 1, wherein by mixing the precursor for obtaining a cathode active material for a non-aqueous electrolyte secondary battery with a lithium compound, or by mixing the precursor after oxidizing roasting with a lithium compound, and performing calcination of the obtained mixture in an oxidizing atmosphere, the cathode active material for a non-aqueous electrolyte secondary battery is obtained.

4. A manufacturing method for a cathode active material for a non-aqueous electrolyte secondary battery, comprising:
    mixing the precursor according to claim 1, or an oxide of the precursor that is obtained by performing oxidizing roasting of the precursor, with a lithium compound; and
    calcinating the obtained mixture in oxidizing atmosphere to obtain a lithium nickel composite oxide that is expressed by the general expression:

$Li_w(Ni_{1-x-y}Co_xAl_y)_{1-z}M_zO_2$ where $0.98 \leq w \leq 1.10$, $0.05 \leq x \leq 0.3$, $0.01 \leq y \leq 0.1$, $0 < z \leq 0.05$, and M is at least one metal element chosen from Mg, Fe, Cu, Zn and Ga, and
    where a crystallite diameter at (003) plane of the lithium nickel composite oxide that is found by X-ray diffraction and the Scherrer equation is within the range of 1200 Å to 1600 Å.

5. The manufacturing method for a cathode active material for a non-aqueous electrolyte secondary battery according to claim 4, wherein the calcination temperature is within the range of 700° C. to 760° C.

6. The manufacturing method for a cathode active material for a non-aqueous electrolyte secondary battery according to claim 4, wherein the lithium compound is lithium hydroxide.

* * * * *